United States Patent
Chopra et al.

(10) Patent No.: US 10,642,698 B1
(45) Date of Patent: May 5, 2020

(54) SYSTEM AND METHOD FOR CONSUMPTION BASED TAGGING OF RESOURCES

(71) Applicant: EMC IP Holding Company LLC, Hopkinton, MA (US)

(72) Inventors: Shelesh Chopra, Bangalore (IN); Gururaj Kulkarni, Bangalore (IN); Mahipat Kulkarni, Bangalore (IN); Mohammed Abdul Samad, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 18 days.

(21) Appl. No.: 16/231,264

(22) Filed: Dec. 21, 2018

(51) Int. Cl.
*G06F 11/14* (2006.01)
*G06F 9/50* (2006.01)
*G06F 11/34* (2006.01)
*G06F 9/455* (2018.01)

(52) U.S. Cl.
CPC ...... *G06F 11/1469* (2013.01); *G06F 9/45558* (2013.01); *G06F 9/5077* (2013.01); *G06F 11/1464* (2013.01); *G06F 11/3414* (2013.01); G06F 2009/45583 (2013.01); G06F 2201/815 (2013.01); G06F 2209/503 (2013.01); G06F 2209/508 (2013.01); G06F 2209/5022 (2013.01)

(58) Field of Classification Search
CPC ......... G06F 11/34–3442; G06F 11/1446–1469
See application file for complete search history.

(56) References Cited

U.S. PATENT DOCUMENTS

| | | | | |
|---|---|---|---|---|
| 8,498,966 B1* | 7/2013 | Waghole | ............. | G06F 11/1461 707/645 |
| 9,628,561 B1* | 4/2017 | Kulkarni | ............. | G06F 11/1464 |
| 9,720,783 B1* | 8/2017 | Kulkarni | ............. | G06F 11/1461 |
| 9,977,704 B1* | 5/2018 | Chopra | ............. | G06F 11/0709 |
| 10,140,187 B1* | 11/2018 | Chan | ............. | G06F 11/3062 |
| 10,146,471 B1* | 12/2018 | Samad | ............. | G06F 3/065 |

(Continued)

OTHER PUBLICATIONS

C. Vaughn et al., "Soothsayer: Predicting Capacity Usage in Backup Storage Systems," 2015 IEEE 23rd International Symposium on Modeling, Analysis, and Simulation of Computer and Telecommunication Systems, Atlanta, GA, 2015, pp. 208-217. (Year: 2015).*

*Primary Examiner* — Khoa D Doan
(74) *Attorney, Agent, or Firm* — Chamberlain, Hrdlicka, White, Williams & Aughtry

(57) ABSTRACT

A remote agent for managing virtual machines includes a persistent storage that stores backup/restoration policies. The remote agent includes a resource tagger that applies first tags to the virtual machines based on computing resource consumption of the virtual machines for providing services to clients. The remote agent includes a storage manager that obtains a backup generation request for a virtual machine of the virtual machines; in response to obtaining the backup generation request: makes a determination that a tag of the first tags is associated with the virtual machine; in response to the determination: generates a composite workflow based on: a computing resource limitation indicated by the tag and a backup policy of the backup/restoration policies associated with the virtual machine; and generates a backup for the virtual machine based on the composite workflow.

17 Claims, 12 Drawing Sheets

(56) References Cited

U.S. PATENT DOCUMENTS

| | | | | |
|---|---|---|---|---|
| 10,148,498 | B1* | 12/2018 | Gould | H04L 67/1095 |
| 10,496,431 | B2* | 12/2019 | Aravot | G06F 9/45558 |
| 2008/0244601 | A1* | 10/2008 | Zeis | G06F 9/5011 |
| | | | | 718/104 |
| 2011/0191559 | A1* | 8/2011 | Li | G06F 12/16 |
| | | | | 711/162 |
| 2012/0079221 | A1* | 3/2012 | Sivasubramanian | |
| | | | | G06F 11/1456 |
| | | | | 711/162 |
| 2016/0062858 | A1* | 3/2016 | Gallagher | G06F 11/2048 |
| | | | | 714/6.23 |
| 2016/0373291 | A1* | 12/2016 | Dornemann | H04L 67/28 |
| 2017/0168729 | A1* | 6/2017 | Faulkner | G06F 3/061 |
| 2017/0351426 | A1* | 12/2017 | Anderson | G06F 3/061 |
| 2020/0019465 | A1* | 1/2020 | Khan | G06F 11/1451 |
| 2020/0019479 | A1* | 1/2020 | Liu | G06F 9/45558 |

\* cited by examiner

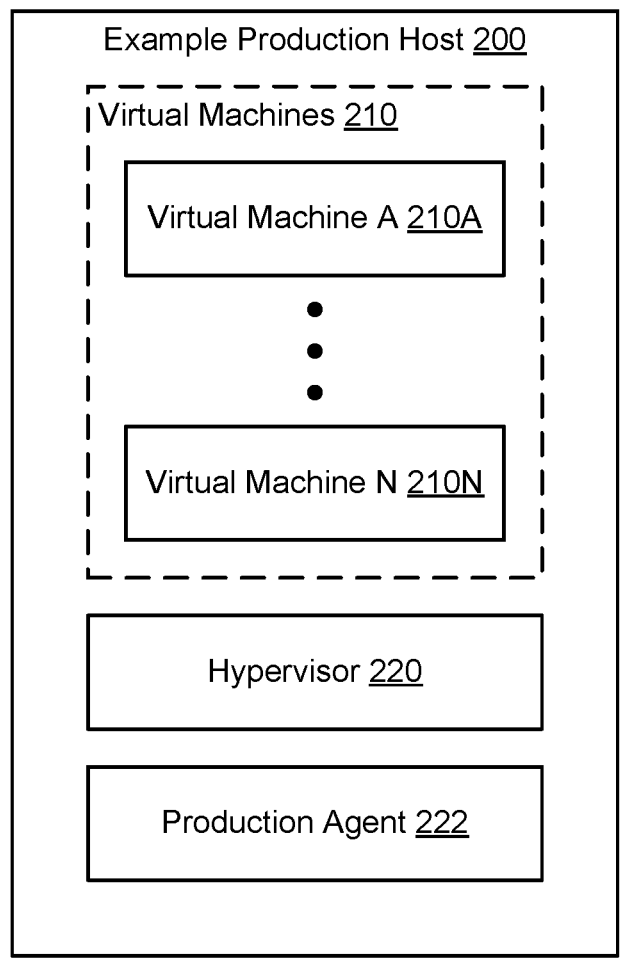
FIG. 2.1

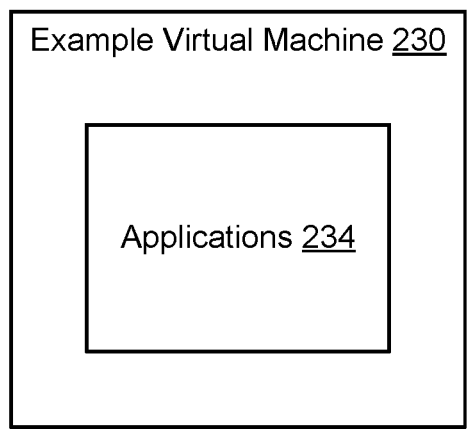
FIG. 2.2

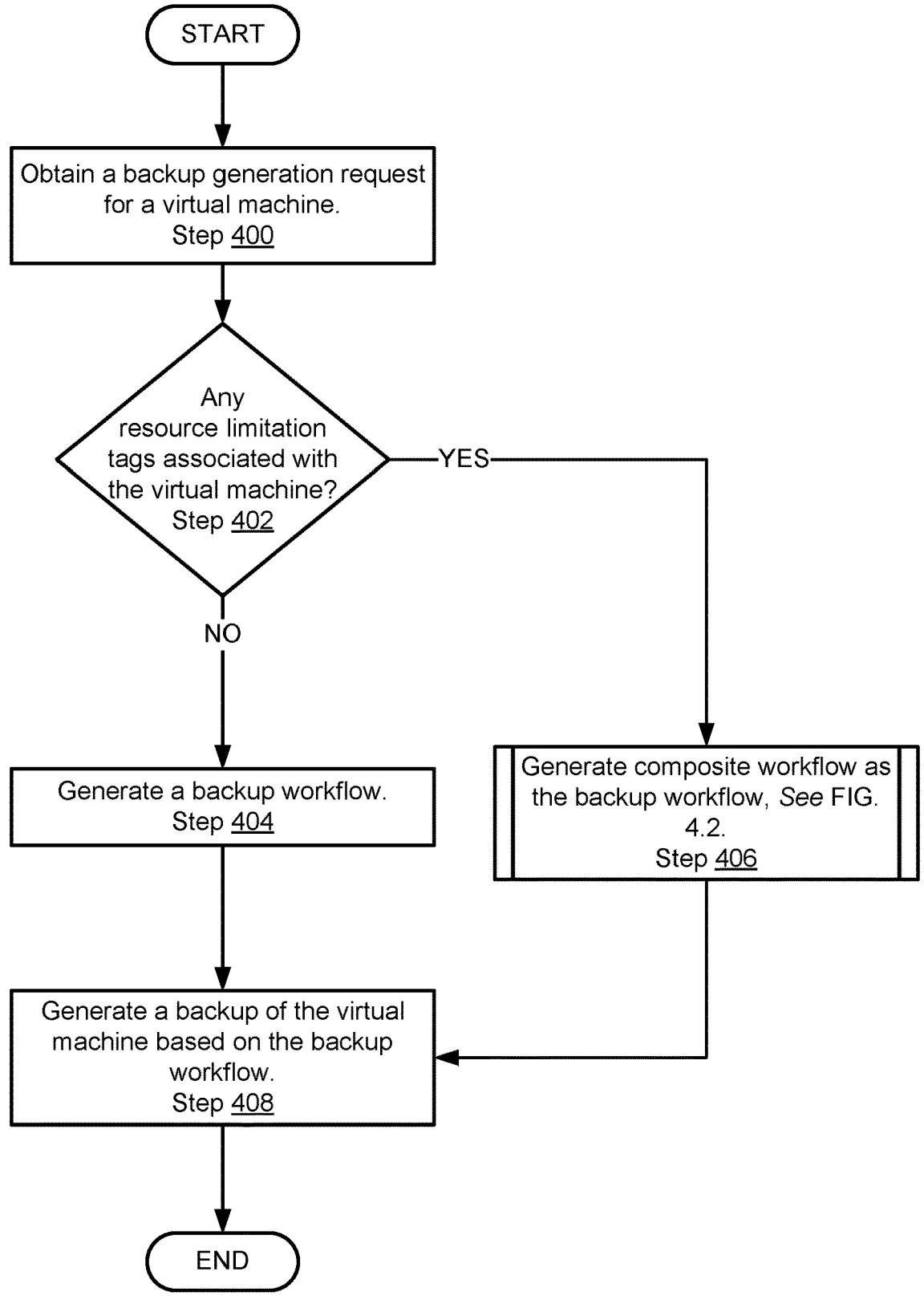
FIG. 4.1

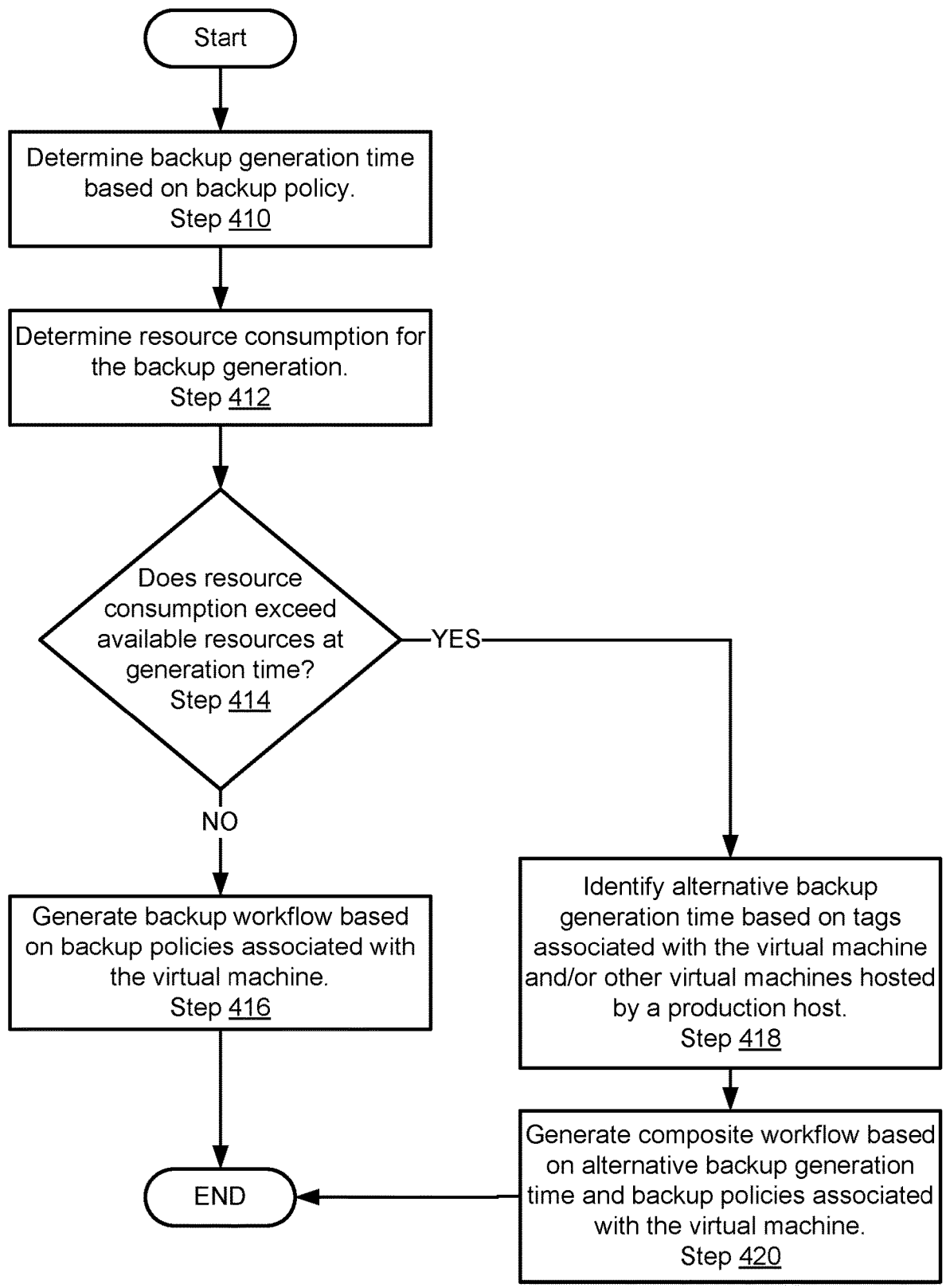
FIG. 4.2

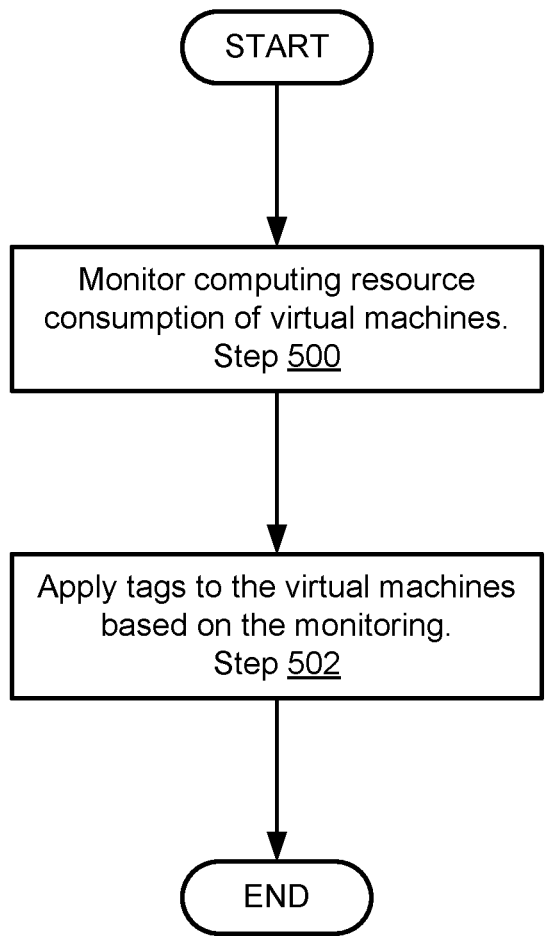
FIG. 5.1

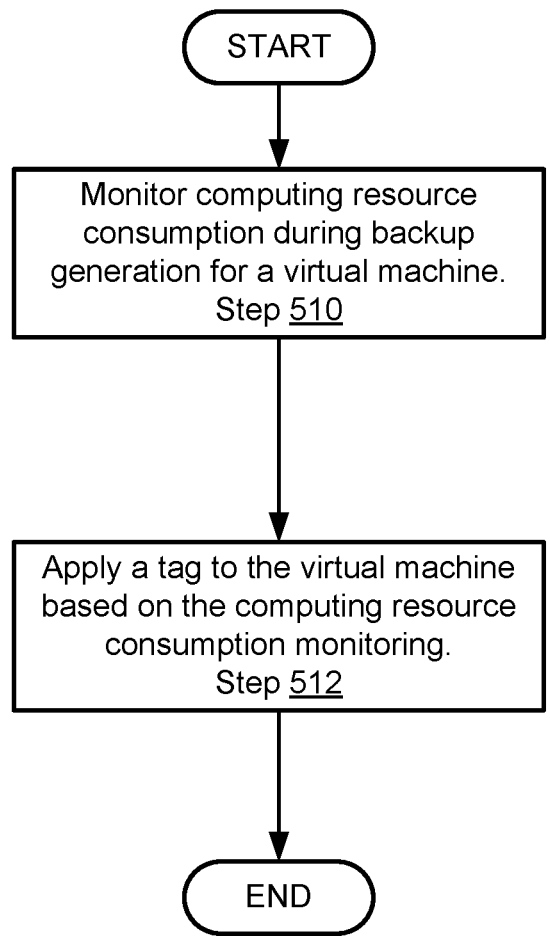
FIG. 5.2

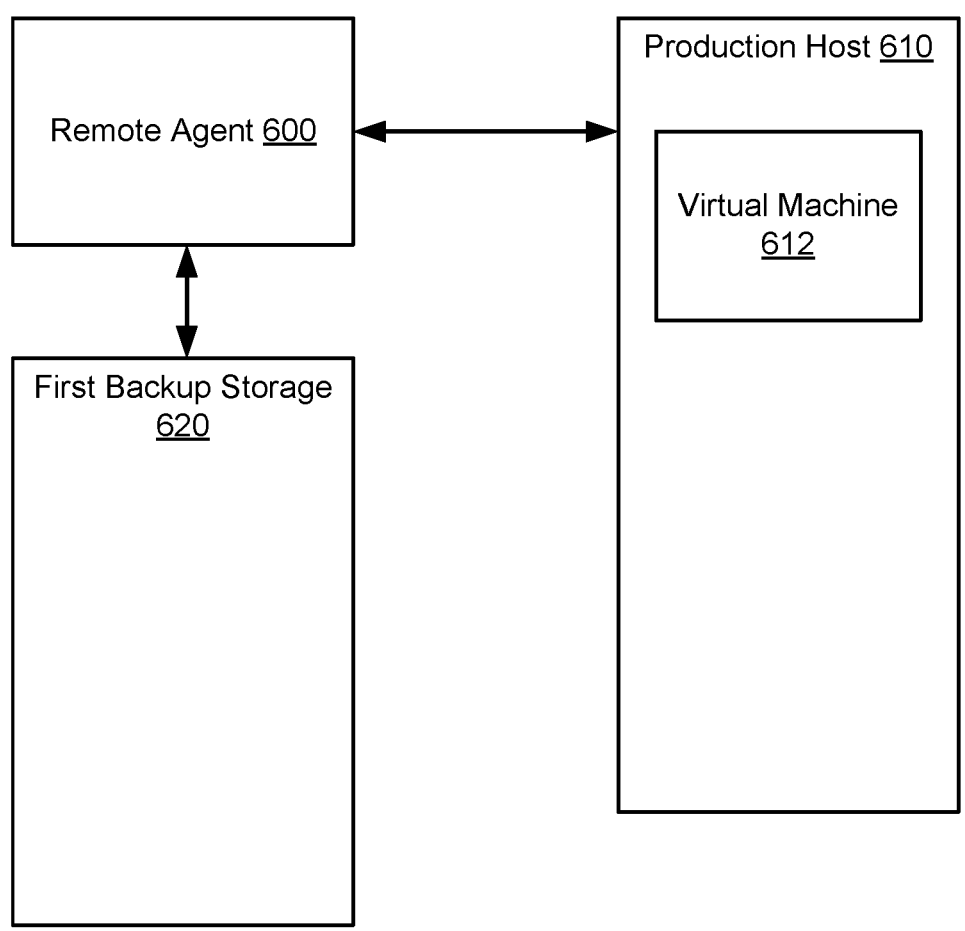
FIG. 6.1

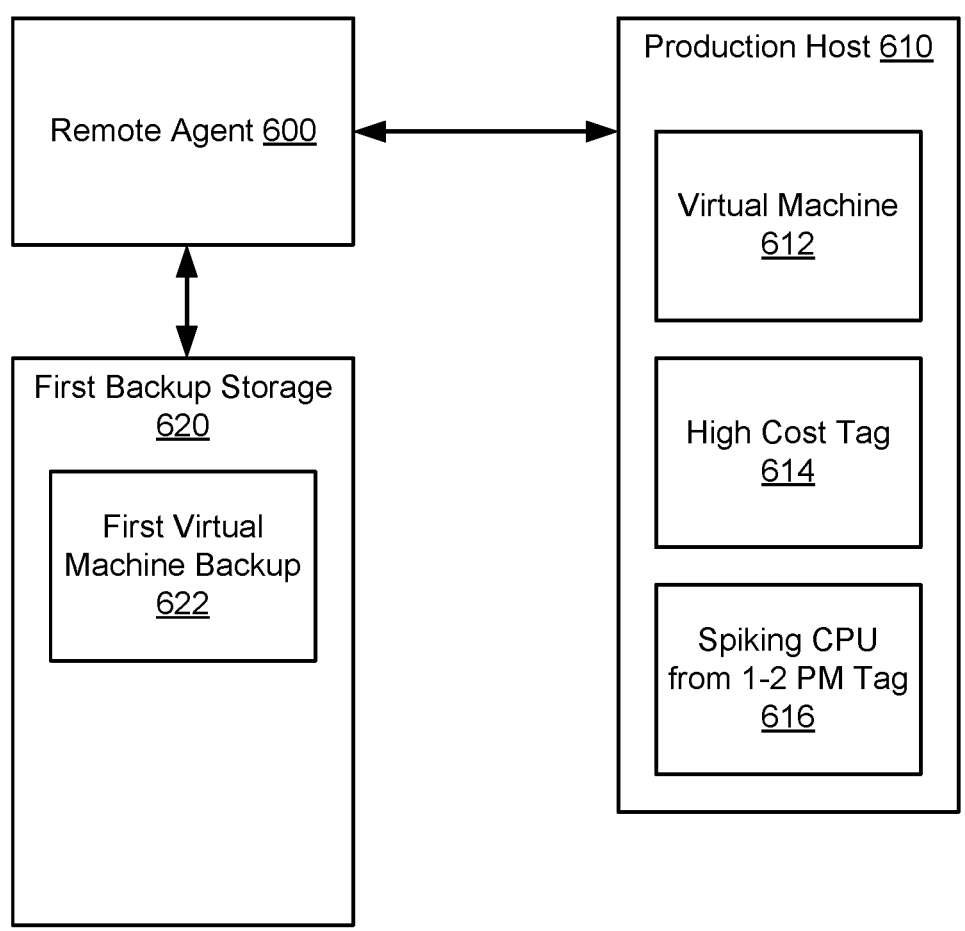
FIG. 6.2

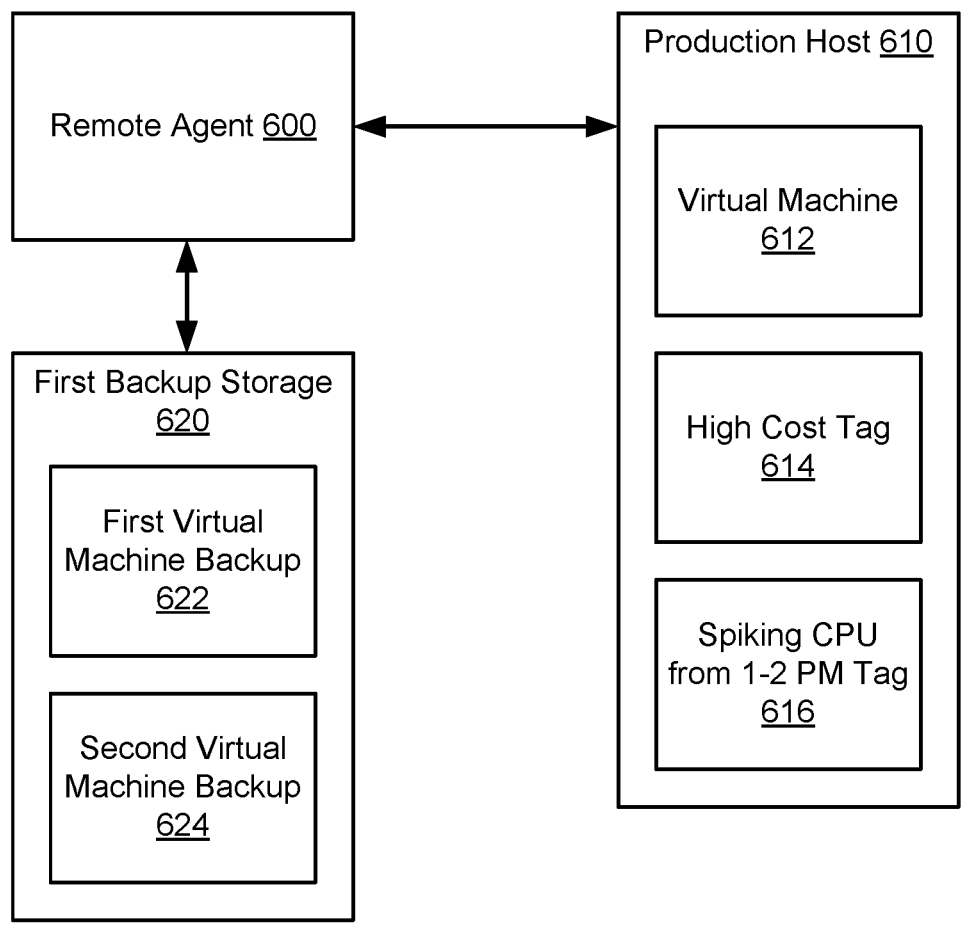
FIG. 6.3

SYSTEM AND METHOD FOR CONSUMPTION BASED TAGGING OF RESOURCES

BACKGROUND

Computing devices may store information. The information may reflect information entered by a user. Such information may be important to the user and/or other users.

For example, a user may type information into a database, may add data to a spreadsheet, or may draft emails. Each of these interactions between a user and a computing device may cause information important to a user to be stored in a computing device.

SUMMARY

In one aspect, a remote agent for managing virtual machines in accordance with one or more embodiments of the invention includes a persistent storage, a resource tagger, and a storage manager. The persistent storage stores backup/restoration policies. The resource tagger applies first tags to the virtual machines based on computing resource consumption of the virtual machines for providing services to clients. The storage manager obtains a backup generation request for a virtual machine of the virtual machines; in response to obtaining the backup generation request: makes a determination that a tag of the first tags is associated with the virtual machine; in response to the determination: generates a composite workflow based on: a computing resource limitation indicated by the tag and a backup policy of the backup/restoration policies associated with the virtual machine; and generates a backup for the virtual machine based on the composite workflow.

In one aspect, a method for managing virtual machines in accordance with one or more embodiments of the invention includes obtaining a backup generation request for a virtual machine; in response to obtaining the backup generation request: making a determination that a first tag is associated with the virtual machine; in response to the determination: generating a composite workflow based on: a computing resource limitation indicated by the first tag and a backup policy associated with the virtual machine; and generating a backup for the virtual machine based on the composite workflow.

In one aspect, a non-transitory computer readable medium in accordance with one or more embodiments of the invention includes computer readable program code, which when executed by a computer processor enables the computer processor to perform a method for managing virtual machines. The method includes obtaining a backup generation request for a virtual machine; in response to obtaining the backup generation request: making a determination that a first tag is associated with the virtual machine; in response to the determination: generating a composite workflow based on: a computing resource limitation indicated by the first tag and a backup policy associated with the virtual machine; and generating a backup for the virtual machine based on the composite workflow.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of a virtual machine in accordance with one or more embodiments of the invention.

FIG. 4.1 shows a flowchart of a method of providing backup services in accordance with one or more embodiments of the invention.

FIG. 4.2 shows a flowchart of a method of generating a composite workflow in accordance with one or more embodiments of the invention.

FIG. 5.1 shows a flowchart of a method of providing resource availability tagging services in accordance with one or more embodiments of the invention.

FIG. 5.2 shows a flowchart of a method of providing resource consumption tagging services in accordance with one or more embodiments of the invention.

FIG. 6.1 shows a diagram of an example system at a first point in time.

FIG. 6.2 shows a diagram of the example system of FIG. 6.1 at a second point in time.

FIG. 6.3 shows a diagram of the example system of FIG. 6.1 at a third point in time.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing backup services in a distributed computing environment. More specifically, the systems, devices, and methods may orchestrate generation of backups in a distributed environment in a manner that reduces the likelihood of phantom slowdowns of the distributed computing environment and/or improves the likelihood of completing generation and storage of backups.

In one or more embodiments of the invention, the system automatically tags virtual machines. The tags applied to the virtual machines may reflect the availability of computing resources of the virtual machines and/or estimates for the cost of generating backups for the virtual machines. Tagging may be performed prior to generation of backups for the virtual machines. The system may take such tags into account when scheduling and performing backups of the virtual machines. By doing so, the system may be less prone to over consume computing resources when generating backups for the virtual machines and improve the likelihood of successful generation of the backups. Further, by applying tags to virtual machines during periods of time during which backups are generated, computing resources during time periods in which backups are generated may be made more available.

Figure 1:
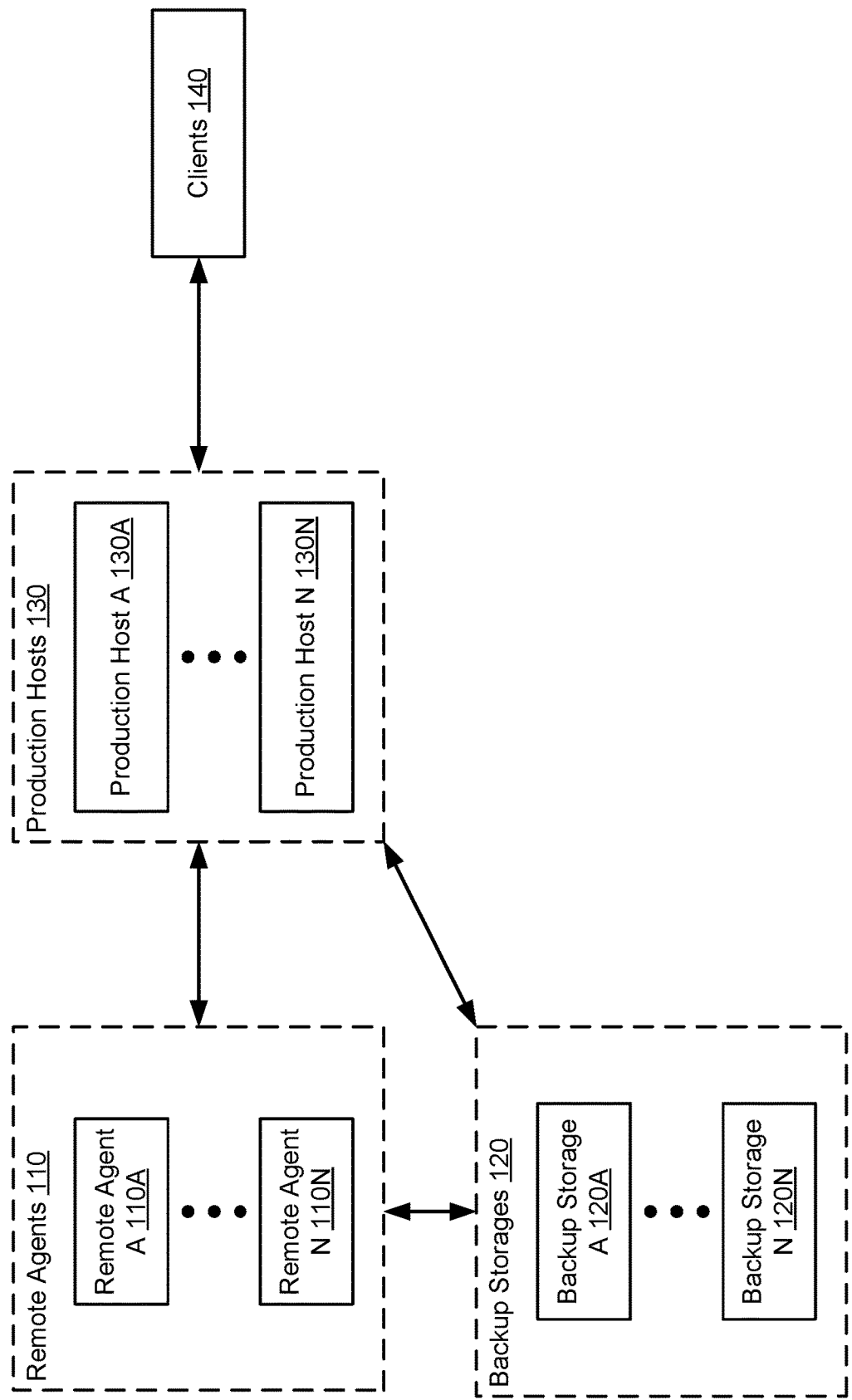
FIG. 1 shows a diagram of a system in accordance with one or more embodiments of the invention.

FIG. 1 shows an example system in accordance with one or more embodiments of the invention. The system may include clients (140) that obtain services from virtual machines hosted by production hosts (130). For additional details regarding production hosts, refer to FIG. 2.1. For additional details regarding virtual machines, refer to FIG. 2.2.

The remote agents (110) may provide backup generation services for virtual machines. The backup generation services may include orchestrating generation and/or storage of backups of the virtual machines in backup storage (120). The remote agents (110) may orchestrate generation of backups based on tags applied to the virtual machines and/or backup policies that specify workflows for generating such backups. By generating such backups, the virtual machines may be able to be restored in the event of a virtual machine or virtual machine host failure. The system may include any number of remote agents (e.g., 110A, 110N).

To facilitate backup generation and storage, the remote agents (110) may monitor the virtual machines and apply tags to the virtual machines. Tags may be metadata that indicates: (i) the availability of computing resources of the virtual machines and/or (ii) the computing resource cost for generating a backup of the virtual machines.

Each component of the system of FIG. 1 may be operably connected via any combination of wired and wireless connections. Each component of the system of FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, refer to FIG. 7.

The clients (140) may interact with applications hosted by the production hosts (130). For example, the applications may be databases, email servers, or any other type of application. The clients (140) may utilize services provided by these examples of applications or other application types hosted by the production hosts (130). By utilizing the services of the applications, data that is important to the clients (140) may be stored as part of application data for each respective application on the production hosts (130) or at other locations.

For example, a production host may host an email application (or a virtual machine that hosts the email application). A client may utilize the services of the email application by receiving and sending emails via the email application. Copies of the client's emails may be stored as part of the email application data. By doing so, the email application may host data in the form of emails that are important to the client.

In one or more embodiments of the invention, the applications are hosted by virtual machines. The virtual machines may be hosted by the production hosts (130). In this manner, different clients may be provided different services by different virtual machines which are, in turn, hosted by different production hosts. The system may include any number of production hosts (e.g., 130A, 130N).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and all, or a portion, of the methods illustrated in FIGS. 4.1-5.2. The production hosts (130) may be other types of computing devices without departing from the invention. For additional details regarding computing devices, refer to FIG. 7.

In one or more embodiments of the invention, the production hosts (130) are distributed computing devices. A distributed computing device may refer to functionality provided by a logical device that utilizes the computing resources of one or more separate and/or distinct computing devices. For example, in one or more embodiments of the invention, the production hosts (130) may be distributed devices that include components distributed across any number of separate and/or distinct computing devices. In such a scenario, the functionality of the production hosts (130) may be performed by multiple different computing devices without departing from the invention.

In one or more embodiments of the invention, the production hosts (130) host virtual machines. Each of the virtual machines may host any number of applications. The applications may provide services to the clients (140), or any other entity. For additional details regarding the production hosts (130), refer to FIG. 2.1.

In one or more embodiments of the invention, the remote agents (110) are computing devices. A computing device may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion, of the methods illustrated in FIGS. 4.1-5.2. The remote agents (110) may be other types of computing devices without departing from the invention. For additional details regarding computing devices, refer to FIG. 7.

In one or more embodiments of the invention, the remote agents (110) are distributed computing devices. A distributed computing device may refer to functionality provided by a logical device that utilizes the computing resources of one or more separate and/or distinct computing devices. For example, in one or more embodiments of the invention, the remote agent (110) may be distributed devices that include components distributed across any number of separate and/or distinct computing devices. In such a scenario, the functionality of the remote agent (110) may be performed by multiple different computing devices without departing from the invention.

In one or more embodiments of the invention, the remote agents (110) provide backup generation services and/or tagging services to the production hosts. Tagging services may include applying tags to the virtual machines hosted by the production hosts (130). Tags may be metadata that reflects characteristics of the virtual machines. Different types of tags may be applied to the virtual machines that reflect different types of characteristics of the virtual machines. Any number of tags may be applied and each applied tag may be representative of similar and/or different characteristics. In one or more embodiments of the invention, tags are applied during periods of time when backups are not being generated. Doing so may improve the availability of computing resource for generating backups. To provide tagging services to the virtual machines of the production hosts (130), the remote agents (110) may perform all or a portion of the methods illustrated in FIGS. 5.1-5.2.

Backup generation services may include the generation of backups of virtual machines and storage of such backups of the virtual machines in backup storages (120). Backups of virtual machines may be data structures usable to restore the state of virtual machines to previous states associated with the backups. When generating backups for the virtual machines, the remote agents (110) may take into account tags that have been applied to the virtual machines. Such tags may be used by the remote agents (110) to modify default workflows for generating backups. The default workflows may be modified based on the tags to improve the functionality of the production hosts (130). By basing workflow modifications on tags, the computing resource consumption for making such modifications may be temporally reduced when compared to other methods of modifying default workflows that perform analysis at the time of workflow modification. By doing so, the availability of computing resource during workflow modification and/or backup generation may be improved when compared to contemporary distributed systems. To provide backup generation services to the virtual machines of the production hosts (130), the remote agents may perform all or a portion of the methods illustrated in FIGS. 4.1-4.2. For additional details regarding remote agents (110), refer to FIG. 3.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIGS. 4.1-5.2. For additional details regarding computing devices, refer to FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across any number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data from the production hosts (130) may be backups of virtual machines hosted by the production hosts (130). Backups of virtual machines may be, for example, virtual machine images, incremental backups, application images, or incremental backups of applications. Other types of backups may be stored in the backup storages (120) without departing from the invention. Any quantity of backup data may be stored in the backup storages (120) without departing from the invention. The backup data may be associated with respective applications and/or virtual machines from which the backup data was obtained. The system may include any number of backup storages (e.g., 120A, 120N).

In one or more embodiments of the invention, the backup storages (120) and/or other components of the system deduplicate the backup data against existing data stored in the backup storages. By deduplicating the backup data, the quantity of data that can be stored in the backup storages may be increased when compared to storing the backup data without deduplication. To deduplicate the backup data, the backup storages (120) may only store copies of unique portions of the backup data. When storing the backup data, the backup data may first be checked to determine whether it is duplicative of data already stored in the backup storage. Only the unique portions of the backup data may be stored in the backup storage. Storing and accessing deduplicated backup data may be significantly more computing resource costly than storing backup data that is not deduplicated.

As discussed above, the backup storages may store data obtained from the production hosts (130). FIG. 2.1 shows a diagram of an example production host (200) in accordance with one or more embodiments of the invention.

In one or more embodiments of the invention, the example production host (200) hosts virtual machines (210). The virtual machines (210) may host any number of applications as will be described in greater detail with respect to FIG. 2.2. Each of the virtual machines (e.g., 210A, 210N) may host similar or different applications without departing from the invention.

In one or more embodiments of the invention, the example production host (200) includes a hypervisor (220). The hypervisor (220) may allocate computing resources to the virtual machines (210). For example, the hypervisor (220) may dedicate processor cycles, memory space, and storage space for use by the virtual machines (210).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

In one or more embodiments of the invention, the example production host (200) includes a production agent (222). The production agent (222) may provide backup services and tagging services to the virtual machines (210). The production agent (222) may be remotely controlled by remote agents to provide such services. When providing backup services and/or tagging services, the production agent (222) may perform all or a part of the methods illustrated in FIGS. 4.1-5.2.

To provide tagging services to the virtual machines (210), the production agent (222) may monitor (i) the availability of computing resources of the virtual machines (210), (ii) the computing resource cost for generating backups of the virtual machines, and/or (iii) other characteristics regarding the computing load of production hosts. The production agent (222) may compare the availability of computing resources of the virtual machines (210) to tagging policies and apply any tags specified by the tagging policies with the conditions for the tagging policies are met. Table 1 shows examples of tagging policies in accordance with embodiments of the invention.

TABLE 1

Example Tagging Policies

| Resource Type | Threshold | Tag |
| --- | --- | --- |
| CPU | Average use >70% of total | High CPU intensive VM |
| Memory | Average use >70% of total | High memory intensive VM |
| Storage (IOPS) | Average use >70% of total | High storage intensive VM |
| CPU | Average use <70% of total; and Max use >95% of total | Spiking CPU VM |
| Memory | Average use <70% of total; and Max use >95% of total | Spiking memory VM |
| Storage | Average IOPS use <30% of total and average storage bandwidth use >90% of total | High performance availability; and high memory intensive VM |

As indicated by Table 1, the first policy specified by row 2 indicates that if the average processor usage is greater than 70% of the total available processor usage, a tag specifying that the virtual machine is a high CPU use virtual machine may be applied. Similarly, the second policy specified by row 3 indicates that if the average memory usage is greater than 70% of the total available memory usage, a tag specifying that the virtual machine is a high memory use virtual machine may be applied. The third policy, like the first and second policies, specified by row 3 indicates that if the average storage input-output cycles (IOPS) is greater than 70% of the total available IOPS, a tag specifying that the virtual machine is a high storage use virtual machine may be applied.

In contrast to the first three policies, the fourth and fifth policies specified in rows 5 and 6 indicate that if the average use is low and the maximum use of CPU or memory during a predetermined period of time is high, a tag indicating that the virtual machine is a spiking use virtual machine may be applied.

The last example policy, shown in row 7, specified that if a virtual machine utilizes few TOPS but has a high average bandwidth use rate, the virtual machine may be tagged as a high performance available but high memory use virtual machine.

When a virtual machine meets any of these policies, a corresponding tag may be applied to the virtual machine by the production agent (222). Consequently, multiple tags may be applied to the virtual machine to reflect multiple characteristics of the computing resource availability of the virtual machine.

In addition to the tags specified in Table 1, additional information may be included in the tags to reflect the general availability of the computing resources of the virtual machine. For example, when a virtual machine is tagged as a spiking use virtual machine, the periods of time of the spiking use may be included in the tags. Additional information may be included in the tags without departing from the invention. Further, while Table 1 shows a limited number of policies key to specific characteristics of the virtual machines, additional, fewer, and/or different policies keyed to different characteristics may be used without departing from the invention. For example, multiple policies with different thresholds (e.g., >70%, >50%, <30%) may be utilized to more granularly classify the virtual machines with respect to their computing resource use characteristics.

In addition to tags reflecting the availability of computing resources, the production agent (222) also apply tags the virtual machines that reflect the computing resource cost of generating backups for the virtual machines. For example, whenever the production agent (222) orchestrates generation of a backup for a virtual machine, production agent (222) may identify the computing resource cost for generating such a backup and may either apply a new tag or update an existing tag to reflect the computing resource cost for generating the backup.

To provide backup services to the virtual machines (210), production agent (222) may generate backups of the virtual machines (210). The production agent (222) may generate backups of the virtual machines (210) when instructions to generate such backups are received by the production agent (222) from a remote agent.

In one or more embodiments of the invention, the production agent (222) is a hardware device including circuitry. The production agent (222) may be, for example, a digital signal processor, a field programmable gate array, or an application specific integrated circuit. The production agent (222) may be other types of hardware devices without departing from the invention.

In one or more embodiments of the invention, the production agent (222) is implemented as computing code stored on a persistent storage that when executed by a processor performs the functionality of the production agent (222). The processor may be a hardware processor including circuitry such as, for example, a central processing unit or a microcontroller. The processor may be other types of hardware devices for processing digital information without departing from the invention.

As discussed above, production hosts may host virtual machines. FIG. 2.2 shows a diagram of an example virtual machine (230) in accordance with one or more embodiments of the invention. The example virtual machine (230) may be a virtualized entity utilizing computing resources of one or more production hosts. The example virtual machine (230) may host any number of applications (234). The applications (234) may be, for example, transactional databases, email servers, file storage, or any other type of application that may provide services to clients. Applications (234) may provide services to other entities without departing from the invention.

Applications (234) may utilize computing resources of the virtual machine hosting the applications (234). The computing resources may be, in turn, allocated to the virtual machine hosting the applications from a production host that hosts the virtual machine.

Figure 3:
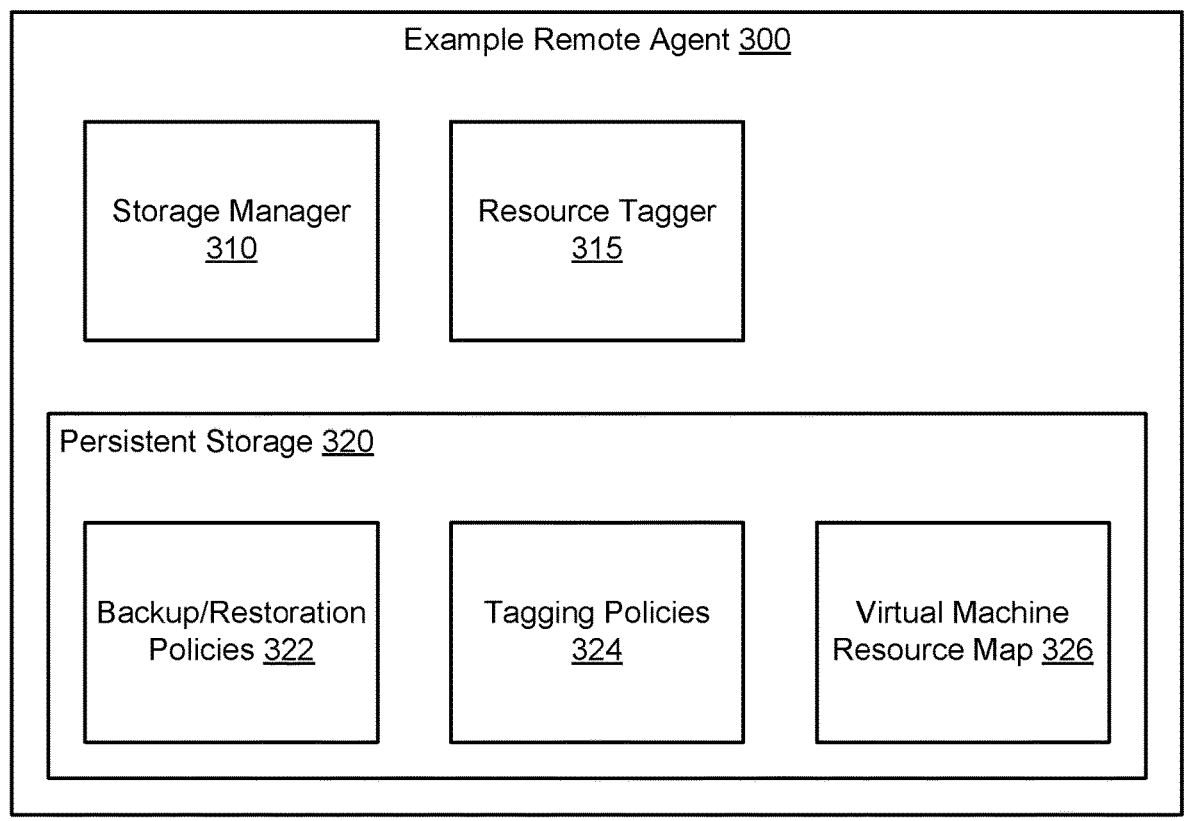
FIG. 3 shows a diagram of an example remote agent in accordance with one or more embodiments of the invention.

As discussed above, the remote agents may orchestrate storage of production host data such as backups of virtual machines in backup storage. FIG. 3 shows a diagram of an example remote agent (300) in accordance with one or more embodiments of the invention.

In one or more embodiments of the invention, the example remote agent (300) provides backup generation services and tagging services to production hosts. To provide the aforementioned functionality, the example remote agent (300) may include a storage manager (310), a resource tagger (315), and a persistent storage (320). Each component of the example remote agent (300) is discussed below.

In one or more embodiments of the invention, the storage manager (310) provides backup services to production hosts. To provide backup services to production hosts, the storage manager (310) may orchestrates generation of backups of virtual machines hosted by production hosts and storage of the backups in backup storage. The storage manager (310) may utilize backup/restoration policies (322), a virtual machine resource map (326), and tags applied to virtual machines when providing backup services. To provide the aforementioned functionality, the storage manager (310) may perform all, or a portion, of the methods illustrated in FIGS. 4.1-4.2.

In one or more embodiments of the invention, the storage manager (310) is a hardware device including circuitry. The storage manager (310) may be, for example, a digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be a hardware processor including circuitry such as, for example, a central processing unit or a microcontroller. The processor may be other types of hardware devices for processing digital information without departing from the invention.

In one or more embodiments of the invention, the resource tagger (315) provides tagging services to production hosts. To provide tagging services to the production hosts, the resource tagger (315) may orchestrate the application of tags to virtual machines hosted by the production hosts. The resource tagger (315) may send instructions to production agents to apply tags to virtual machines. The instructions may include policies similar to those discussed with respect to Table 1 to production agents. In turn, the production agents may apply such tags to the virtual machines. When providing tagging services, the resource tagger (315) may utilize tagging policies (324). To provide the aforementioned functionality, the resource tagger (315) may perform all, or a portion, of the methods illustrated in FIGS. 5.1-5.2.

In one or more embodiments of the invention, the resource tagger (315) is a hardware device including circuitry. The resource tagger (315) may be, for example, a digital signal processor, a field programmable gate array, or an application specific integrated circuit. The resource tagger (315) may be other types of hardware devices without departing from the invention.

In one or more embodiments of the invention, the resource tagger (315) is implemented as computing code stored on a persistent storage that when executed by a processor performs the functionality of the resource tagger (315). The processor may be a hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or logical device. For example, the persistent storage (320) may include solid state drives, solid state drives, tape drives, and other components to provide data storage functionality. Alternatively, the persistent storage (320) may be a logical device that utilizes the physical computing resources of other components to provide data storage functionality.

In one or more embodiments of the invention, the persistent storage (320) stores backup/restoration policies (322), tagging policies (324), and a virtual machine resource map (326). Each of these data structures is discussed below.

The backup/restoration policies (322) may be data structures that specify the default workflows for generating backups and perform restorations of entities. The policies of the backup/restoration policies (322) may specify any number of characteristics of the workflows including, but not limited to, when a backup is generated, where it is stored, and a redundancy of the storage of the generated backup.

The tagging policies (324) may be a data structure that specifies tags to be applied to virtual machines when the virtual machines have characteristics matching those associated with the tags by the tagging policies. For example, the tagging policies (324) may include thresholds regarding the utilization rate of computing resources of the virtual machines as illustrated in Table 1. When such thresholds are met, the policy may indicate that a tag specified by the policy is to be applied to the virtual machine having a utilization rate that meets the thresholds. The tagging policies (324) may include any number of policies without departing from the invention.

The virtual machine resource map (326) may be a data structure that specifies the availability of computing resources of virtual machines hosted by production hosts. The virtual machine resource map (326) may be generated based on monitoring performed by production agents hosted by the production hosts. For example, the production agents may monitor the availability of computing resources of virtual machines over time and report monitoring to the example remote agent (300). The example remote agent (300) may store the results of the monitoring in the virtual machine resource map (326). Thus, the virtual machine resource map (326) may reflect the availability of computing resources of the virtual machines hosted by the production hosts in the past. As will be discussed in greater detail below, the storage manager (310) may utilize virtual machine resource map (326) to predict whether a virtual machine may have sufficient computing resources to generate a backup of the virtual machine during a particular period of time in the future. The virtual machine resource map (326) may specify the availability of computing resources of the virtual machines at any level of granularity and for any duration of time without departing from the invention. In one or more embodiments of the invention, virtual machine resource map (326) may specify the availability of computing resources of the virtual machines in increments of 15 minutes for a period of 24 hours in the past. The virtual machine resource map (326) may specify the availability of computing resources of the virtual machines at other levels of granularity and for different durations of time without departing from the invention. For example, granularities of 1 minute, 60 minutes, 4 hours, 6 hours, 12 hours, 24 hours, etc. may be used. Similarly, the duration of time may be 1 hour, 6 hours, 12 hours, 48 hours, 7 days, 14 days, 1 month, etc. may be used.

While the persistent storage (320) illustrated in FIG. 3 is shown as including a limited number of data structures, the persistent storage (320) may include additional, fewer, and/ or different data structures without departing from the invention. Further, while the data structures are illustrated as being separate, the data included in the data structures (322, 324, 326) may be stored as a single data structure, may include additional information than that discussed above, and may be stored in different locations without departing from the invention.

As discussed above, components of the system of FIG. 1 may perform methods for providing backup services. FIGS. 4.1-4.2 show methods in accordance with one or more embodiments of the invention that may be performed by components of the system of FIG. 1. Any of the steps show in FIGS. 4.1-4.2 may be omitted, performed in a different order, and/or performed in a parallel or partially overlapping manner with respect to other steps without departing from the invention.

FIG. 4.1 shows a flowchart of a method in accordance with one or more embodiments of the invention. The method depicted in FIG. 4.1 may be used to generate a backup of an entity in accordance with one or more embodiments of the invention. The method shown in FIG. 4.1 may be performed by, for example, a remote agent (e.g., 110, FIG. 1). Other components of the system illustrated in FIG. 1 may perform the method of FIG. 4.1 without departing from the invention.

In step 400, a backup generation request for a virtual machine is obtained.

In one or more embodiments of the invention, the backup generation request for the virtual machine is obtained based on a backup policy. For example, a backup policy may indicate that a backup of the virtual machine is to be generated. The backup generation request may be obtained from other sources without departing from the invention.

In step 402, it is determined whether any resource limitation tags are associated with the virtual machine.

As discussed above, tags may be applied to the virtual machines based on computing resource limitations of the virtual machines. Any of the tags shown in Table 1 may be considered a resource limitation tag. Such tags may indicate that a computing resource of the virtual machine is limited. The resource limitation tags may be present prior to the performance of step 402.

If it is determined that a resource limitation tag is associated with the virtual machine, the method may proceed to step 406. If it is determined that no resource limitation tags are associated with the virtual machine, the method may proceed to step 404.

In step 404, a backup workflow is generated.

In one or more embodiments of the invention, the backup workflow is generated based on a backup policy associated with the virtual machine. The backup policy may specify characteristics of the workflow to be performed when generate a backup for the virtual machine. For example, the backup policy may specify when a backup is to be generated, where the backup is to be stored, a level of redundancy for storage of the backup, and/or how the backup is to be managed in storage (e.g., how long to store, where to store during different periods of time, etc.). The backup policy may specify additional, fewer, and/or different characteristics of the workflow.

In step 408, a backup of the virtual machine is generated based on the backup workflow.

In one or more embodiments of the invention, the backup is generated by sending instructions to a production agent hosted by a production host that also hosts the virtual machine. The instructions sent to the production agent may cause the production agent to generate the backup of the virtual machine in accordance with the backup workflow. The instructions may be in any format and may include any quantity of information.

The method may end following step 408.

Returning to step 402, the method may proceed to step 406 following step 402.

In step 406, a composite workflow is generated as the backup workflow.

In one or more embodiments of the invention, a composite workflow is a modification of a default workflow specified by a backup policy associated with the virtual machine. The modification of the default workflow may modify the consumption of computing resources of the virtual machine for generation of the backup.

In one or more embodiments of the invention, the modification of the default workflow time shifts the workflow. Time shifting the workflow may change the start time for the workflow. For example, the workflow may be modified to be performed at a time that is different from the start time specified by the backup policy. The workflow may be time shifted to start at a point in time when the production host hosting the virtual machine has a higher availability of computing resources then at the start time specified by the backup policy.

Time shifting the workflow may change the duration of time during which the workflow is to be performed and/or cap the quantity of computing resources that may be used to perform the workflow. For example, if a default workflow specified by a backup policy specifies a 1 hour window for performing the workflow, the workflow may be modified to be a 4 hour window for performing the workflow while capping the maximum allowed computing resource utilization for performing the workflow at 5% of the total computing resources of the production host that will generate the backup. Different window durations (e.g., 2 hours, 8, hours, 12, hours, etc.) and different computing resource utilization caps (e.g., 1%, 10%, 15%) may be used without departing from the invention.

In one or more embodiments of the invention, the composite workflow is generated via the method illustrated in FIG. 4.2. The composite workflow may be generated via other methods without departing from the invention.

The method may proceed to step 408 following step 406.

FIG. 4.2 shows a flowchart of a method in accordance with one or more embodiments of the invention. The method depicted in FIG. 4.2 may be used to generate a composite workflow in accordance with one or more embodiments of the invention. The method shown in FIG. 4.2 may be performed by, for example, a remote agent (e.g., 110, FIG. 1). Other components of the system illustrated in FIG. 1 may perform the method of FIG. 4.2 without departing from the invention.

In step 410, a backup generation time is determined based on a backup policy.

In one or more embodiments of the invention, the backup generation time may be a start time for the backup generation. In other words, when generation of a backup is to start. The backup policy may specify the backup generation time. The backup generation time may specify other characteristics of the backup generation. For example, the backup generation time may specify a start time and duration, e.g., a window, for generating the backup.

In step 412, the resource consumption for the backup generation is determined.

In one or more embodiments of the invention, the resource consumption is an estimate. The estimate may be generated based on a past computing resource consumption for generating a backup of the virtual machine. The past computing resource consumption may be obtained from a tag associated with the virtual machine. As noted above, production agent may tag a virtual machine with the computing resource cost for generating a backup of the virtual machine whenever a backup of the virtual machine is generated.

In step 414, it is determined whether the resource consumption exceeds the available resources for generating the backup at the generation time.

In one or more embodiments of the invention, the determination is made by comparing the resource consumption determined in step 412 to resource availability of the virtual machine specified by a tag associated with the virtual machine. As discussed above, a production agent may monitor the computing resources available to the virtual machines and apply tags to the virtual machines that indicate temporal availability of computing resources for generation of backups of the virtual machines.

If the resource consumption exceeds the available resources for generating the backup at the generation time, the method may proceed to step 418. If the resource consumption does not exceed the available resources for generating the backup at the generation time the method may proceed to step 416.

In step 416, a backup workflow is generated based on backup policies associated with the virtual machine.

As noted above, the backup policy may specify the default workflow for generating a backup for the virtual machine. The default workflow specified by the backup policy may be used as the backup workflow.

The method may end following step 416.

Returning to step 414, the method may proceed to step 418 if the resource consumption exceeds the available resources at the generation time.

In step 418, an alternative backup generation time is identified based on tags associated with the virtual machine and/or other virtual machines hosted by a production host.

As noted above, a production agent may apply tags to virtual machines reflecting the temporal availability of computing resources of the virtual machines. The alternative backup generation time may be identified by selecting a period of time in which the temporal availability of computing resources of the virtual machine is high.

In one or more embodiments of the invention, the alternative backup generation time is identified by selecting the period of time in which the temporal availability of computing resources of at least two virtual machines is high. The first of the two virtual machines may be the virtual machine for which the backup is to be generated. The second of the two virtual machines may be a virtual machine that is also hosted by the production host that hosts the first virtual machine. Because both virtual machines utilize computing resources of the same production host, the utilization rate of computing resources of both virtual machines may impact the ability of the production host to both generate a backup of the virtual machine and continue to provide services to clients. Thus, a time may be selected where the availability of computing resources of multiple virtual machines hosted by the same production host may be selected.

For example, consider a scenario in which a first virtual machine and a second virtual machine are hosted by a production host. At the start time specified by a backup policy, the first virtual machine may have low computing resource availability. A remote agent may select a new start time for generating the backup by considering the availability of computing resources of both virtual machines at two different times. During the first different time, the first virtual machine may have high computing resource availability but the second virtual machine may have low computing resource availability. In contrast, during a second period of time both virtual machines may have high computing resource availability. The remote agent may select the second period of time as the start time because it is more likely that generating a backup during the second period of time will not negatively impact the ability of the production host to continue to provide services to the clients.

In step 420, the composite workflows generated based on the alternative backup generation time and backup policies associated with the virtual machine.

In one or more embodiments of the invention, the composite workflow is generated by time shifting start time specified by a default workflow specified by backup policies associated with the virtual machine to the alternative backup generation time.

In one or more embodiments of the invention, the composite workflows generated by time shifting the duration of the default workflow to include the alternative backup generation time. A computing resource utilization cap may be added to the default workflow. The cap may limit the quantity of computing resources that may be utilized for the backup generation. The cap may be based on the temporal availability of the computing resources. The cap may be the difference between the minimum temporal availability of the computing resources. For example, if the maximum utilization rate of computing resources is 97%, the cap may be specified at 3%. The cap may be specified differently without departing from the invention.

A factor of safety may be included to further decrease the likelihood that generating the backup may impact the ability of the production host to continue to provide services to the client. For example, if the maximum utilization rate of computing resources is 95%, the cap may be specified at 2.5% to reflect a buffer of 2.5%. Different buffer values may be used without departing from the invention.

The method may end following Step 420.

As discussed above, components of the system of FIG. 1 may perform methods for providing tagging services. FIGS. 5.1-5.2 show methods in accordance with one or more embodiments of the invention that may be performed by components of the system of FIG. 1. Any of the steps show in FIGS. 5.1-5.2 may be omitted, performed in a different order, and/or performed in parallel or partially overlapping manner with respect to other steps without departing from the invention.

FIG. 5.1 shows a flowchart of a method in accordance with one or more embodiments of the invention. The method depicted in FIG. 5.1 may be used to apply computing resource availability tags to virtual machines in accordance with one or more embodiments of the invention. The method shown in FIG. 5.1 may be performed by, for example, a remote agent (e.g., 110, FIG. 1). Other components of the system illustrated in FIG. 1 may perform the method of FIG. 5.1 without departing from the invention.

In step 500, the computing resource consumption of virtual machines monitored.

The computing resource consumption may be for non-backup generation purposes. For example, the computing resource consumption may be for providing services to clients, e.g., computing resources consumed by applications hosted by the virtual machines.

In one or more embodiments of the invention, the computing resource consumption of the virtual machines is monitored by production agents. The computing resource consumption of the virtual machines may be monitored over time. For example, the computing resource consumption of the virtual machines may be monitored every 15 minutes.

The computing resource consumption monitoring may include monitoring of any number of computing resources. For example, processor consumption, memory consumption, storage consumption, and/or network bandwidth may be monitored.

In step 502, tags are applied to the virtual machine based on the monitoring.

In one or more embodiments of the invention, the tags are applied to the virtual machines by a production agent. The production agent may apply such tags based on tagging policies. The tagging policies may specify tags that are to be applied to the virtual machines if criteria specified by the tagging policies are met by the virtual machines. Any number of tags may be applied to the virtual machines without departing from the invention.

For example, consider a scenario in which a first tagging policy specifies that the first tag is to be applied to a virtual machine when the virtual machine exceeds a processor utilization rate of 70% and a second tagging policy specifies that a second tag is to be applied to a virtual machine when the virtual machine exceeds a memory utilization rate of 70%. If a particular virtual machine monitored by a production agent exceeds both thresholds, then both the first tag and the second tag are applied to the virtual machine.

In one or more embodiments of the invention, the tag is metadata associated with the virtual machine. Tags may be stored locally or remotely. Copies or other indicators of tags that have been applied to virtual machines may be sent to remote agents when tags are applied to the virtual machines. For example, when a production agent applies the tag to a virtual machine, a copy of the tag along with an identifier of the virtual machine may be sent to a remote agent that provides backup services to the virtual machine. The remote agent may store a copy of this data for future use during backup generation.

The method may end following step 502.

FIG. 5.2 shows a flowchart of a method in accordance with one or more embodiments of the invention. The method depicted in FIG. 5.2 may be used to apply computing resource consumption tags to virtual machines in accordance with one or more embodiments of the invention. The method shown in FIG. 5.2 may be performed by, for example, a remote agent (e.g., 110, FIG. 1). Other components of the system illustrated in FIG. 1 may perform the method of FIG. 5.2 without departing from the invention.

In step 510, the computing resource consumption of a virtual machine is monitored during backup generation of the virtual machines.

In one or more embodiments of the invention, the computing resource consumption of the virtual machines is monitored by production agents. For example, whenever a production agent orchestrates generation of a backup of a virtual machine, the production agent may identify the quantity of computing resources used for generating the backup.

The computing resource consumption monitoring may include monitoring of any number of computing resources. For example, processor consumption, memory consumption, storage consumption, and/or network bandwidth may be monitored.

In step 512, tag is applied to the virtual machine based on the computer resource consumption monitoring.

In one or more embodiments of the invention, the tag reflects the quantity of computing resources consumed during backup generation.

The method may end following step 512.

Using the methods illustrated in FIGS. 5.1-5.2, multiple tags may be applied to virtual machines. The tags may reflect (i) the previous cost for generating a backup for the virtual machine and (ii) the availability of computing resources of the virtual machine. Such information may be used by the methods illustrated in FIGS. 4.1-4.2 when generating backups of the virtual machines.

To further clarify embodiments of the invention, a non-limiting example is provided in FIGS. 6.1-6.3. FIGS. 6.1-6.3 illustrate a system similar to that of FIG. 1. For the sake of brevity, only a limited number of components of the system of FIG. 1 are illustrated.

Example

Consider a scenario as illustrated in FIG. 6.1 where a remote agent (600) is tasked with providing tagging and backup services at 1 PM every day to the virtual machine (612) hosted by production host (610). The virtual machine (612) may host applications that provide email services to clients. Due to the lunch schedule of the users of the clients, a heavy client load is placed on the production host (610) at 1 PM every day when the user of the clients return from lunch.

To provide tagging services to the virtual machine (612), the remote agent (600) may send tagging policies similar to those shown in Table 1 to a production agent (not shown) of the production host (610). To provide backup services to the virtual machine (612), the production agent (600) may instruct the production agent to generate a backup of the virtual machine (612) at 1 PM. Because no tags have been applied to the virtual machine (612), a default workflow for generating the backup of the virtual machine (612) is utilized for the backup generation. Additionally, because of the large quantity of data stored by the virtual machine (612), the computational cost for generating a backup of the virtual machine (612) is high.

Due to the spiking CPU usage from 1 to 2 PM of the virtual machine (612) caused by users of the clients returning from lunch to check their email, the production agent applies a spiking CPU from 1 to 2 PM tag (616) to the virtual machine (612) as shown in FIG. 6.2. Additionally, when a first backup for the virtual machine (612) is generated, a high cost tag (614) is applied to the virtual machine (612) due to the high computing resource cost of generating the first virtual machine backup (622). The first virtual machine backup (622) is stored in a first backup storage (620) to ensure availability of the backup in the event of failure of the virtual machine (612) or the production host (610).

On the following day when the remote agent (600) begins to orchestrate backup generation for the virtual machine (612) at 1 PM, the remote agent (600) identifies that the spiking CPU from 1 to 2 PM tag (616) in combination with the high cost tag (614) indicates that generating a backup at 1 PM is likely to reduce the ability of the virtual machine (612) to provide the email services to clients at 1 PM due to reduced availability of computing resources of the production host (612) hosting the virtual machine. Rather than orchestrating generation of the backup for the virtual machine (612) at 1 PM, the remote agent (600) time shifts the backup generation to begin at 3 PM. Consequently, when the second virtual machine backup (624) is generated as illustrated in FIG. 6.3, generation of the backup does not impair the ability of the production host (610) to continue to provide services to the clients. Like the first virtual machine backup (622), the second virtual machine backup (624) is stored in the first backup storage (620).

End of Example

Figure 7:
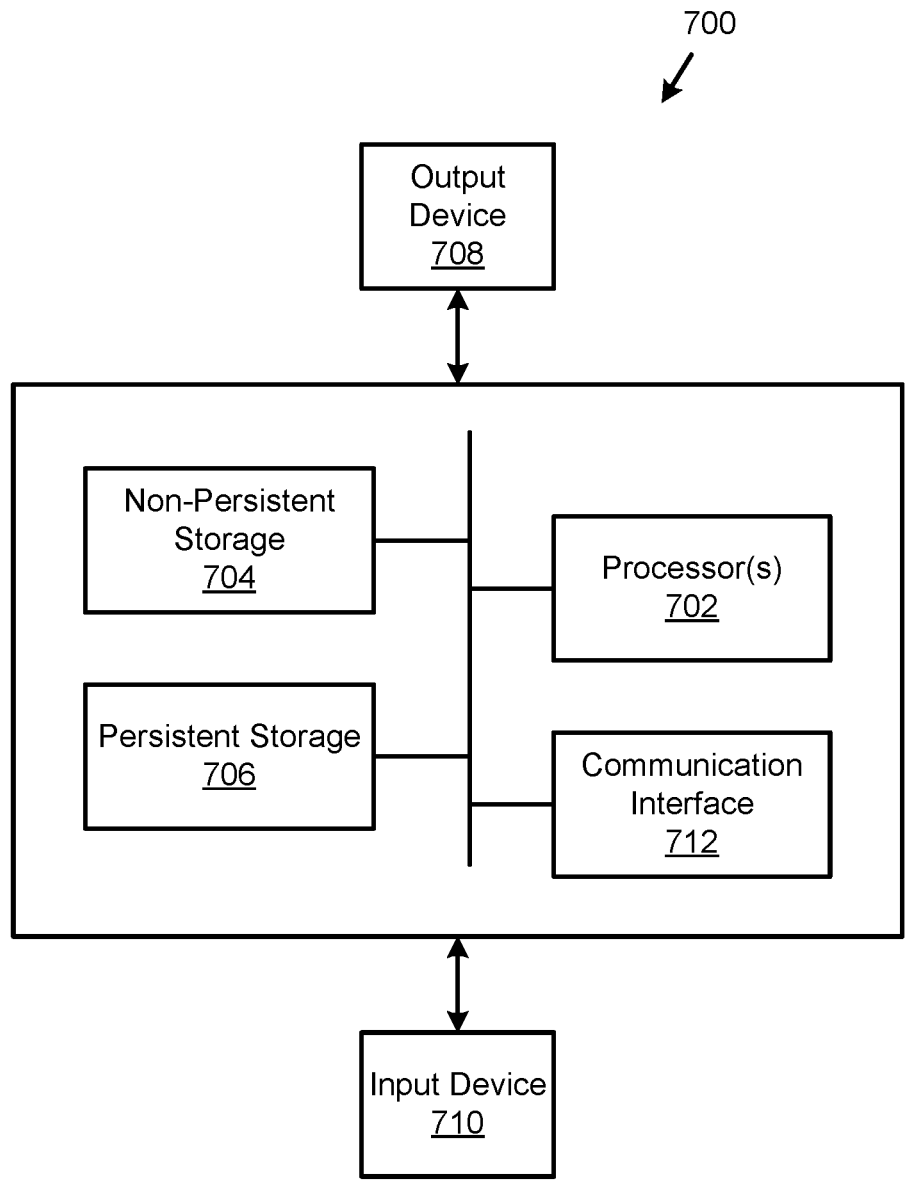
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention may improve the field of distributed computation. Specifically, embodiments of the invention may improve the reliability of storing data in a distributed environment. Embodiments of the invention may improve the reliability for storing data in a distributed environment by improving the likelihood that redundant copies of the data are stored in multiple locations within the distributed environment. For example, embodiments of the invention may automatically time shift when backups of data are to be generated and stored in the distributed environment. Embodiments of the invention may time shift backup generation to periods of time in which the availability of computing resources is high. The high availability period of time may be identified based upon the historic use of computing resources by multiple entities hosted by a computing device. By doing so, the likelihood of successful generation and storage of backups may be improved when compared to contemporary methods of storing data in a distributed environment.

Additional embodiments of the invention may improve the field of backup generation technology. Specifically, embodiments of the invention may improve backup generation by reducing the likelihood of causing phantom slowdowns in a distributed computation environment. In modern distributed computing environments, any physical computing device may be providing services to any number of other physical computing devices. Consequently, overconsumption of computing resources of a physical computing device for backup generation purposes may impact the quality of computing services provided to multiple devices. Because users are unlikely to be aware of backup generation, such service degradations may appear to be phantom slowdowns to the users. Embodiments of the invention may address this problem by applying tags to the virtual machines within the distributed environment that reflect both the availability of computing resources to the virtual machines and the estimated cost for generating a backup of the virtual machines. Remote agents within the distributed computing environment may take these tags into account when generating backups of the virtual machines. Consequently, embodiments of the invention may reduce the likelihood of the occurrence the phantom slowdowns within a distributed environment. Thus, embodiments of the invention may improve the field of distributed systems by improving the performance of such systems.

The problems discussed above should be understood as being examples of problems solved by embodiments of the invention disclosed herein and the invention should not be limited to solving the same/similar problems. The disclosed invention is broadly applicable to address a range of problems beyond those discussed here.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for managing virtual machines, comprising:
   a persistent storage that stores backup/restoration policies; a resource tagger programmed to apply first tags to the virtual machines based on computing resource consumption of the virtual machines for providing services to clients; and a storage manager programmed to: obtain a backup generation request for a virtual machine of the virtual machines; in response to obtaining the backup generation request: make a determination that a tag of the first tags is associated with the virtual machine; in response to the determination: generate a composite workflow based on: a computing resource limitation indicated by the tag, and a backup policy of the backup/restoration policies associated with the virtual machine; and generate a backup for the virtual machine based on the composite workflow;

wherein the resource tagger is further programmed to: apply second tags to the virtual machines based on computing resource consumption of the virtual machines for generating backups.

2. The remote agent of claim 1, wherein generating the composite workflow comprises: identifying a generation time indicated by the backup policy; identifying a resource limitation time indicated by the computing resource limitation; and time shifting the generation time of the backup policy based on the resource limitation time.

3. The remote agent of claim 1, wherein generating the composite workflow comprises: estimating a quantity of computing resources for generating the backup for the virtual machine; making a second determination that the quantity of computing resources exceeds an available quantity of computing resources using the second tags; and in response to the second determination: time shifting a generation time for generating the backup.

4. The remote agent of claim 3, wherein the time shifting comprises: changing a start time for generating the backup.

5. The remote agent of claim 3, wherein the time shifting comprises: expanding a time period for generating the backup, and capping a computing resource utilization rate for generating the backup.

6. The remote agent of claim 1, wherein applying the first tags to the virtual machines comprises: monitoring consumption of computing resources by a first virtual machine of the virtual machines over a predetermined period of time; matching the consumption of computing resources to a second tag of the first tags; and updating a computing resource consumption tag associated with the first virtual machine based on the second tag.

7. A method for managing virtual machines, comprising:
obtaining a backup generation request for a virtual machine;
in response to obtaining the backup generation request: making a determination that a first tag is associated with the virtual machine;
in response to the determination: generating a composite workflow based on: a computing resource limitation indicated by the first tag, and a backup policy associated with the virtual machine;
and generating a backup for the virtual machine based on the composite workflow;
applying a second tag to the virtual machine based on computing resource consumption of the virtual machine for a previously generated backup of the virtual machine.

8. The method of claim 7, wherein generating the composite workflow comprises: identifying a generation time indicated by the backup policy; identifying a resource limitation time indicated by the computing resource limitation; and time shifting the generation time of the backup policy based on the resource limitation time.

9. The method of claim 7, wherein generating the composite workflow comprises: estimating a quantity of computing resources for generating the backup for the virtual machine; making a second determination that the quantity of computing resources exceeds an available quantity of computing resources of the virtual machine using the second tag; and in response to the second determination: time shifting a generation time for generating the backup.

10. The method of claim 9, wherein the time shifting comprises: changing a start time for generating the backup.

11. The method of claim 9, wherein the time shifting comprises: expanding a time period for generating the backup, and capping a computing resource utilization rate for generating the backup.

12. The method of claim 7, further comprising: monitoring consumption of computing resources by the virtual machine over a predetermined period of time; matching the consumption of computing resources to the first tag; and updating a computing resource consumption tag associated with the virtual machine based on the first tag.

13. A non-transitory computer readable medium comprising computer readable program code, which when executed by a computer processor enables the computer processor to perform a method for managing virtual machines, the method comprising:
obtaining a backup generation request for a virtual machine; in response to obtaining the backup generation request:
making a determination that a first tag is associated with the virtual machine;
in response to the determination: generating a composite workflow based on: a computing resource limitation indicated by the first tag, and a backup policy associated with the virtual machine;
and generating a backup for the virtual machine based on the composite workflow;
applying a second tag to the virtual machine based on computing resource consumption of the virtual machine for a previously generated backup of the virtual machine.

14. The non-transitory computer readable medium of claim 13, wherein generating the composite workflow comprises: identifying a generation time indicated by the backup policy; identifying a resource limitation time indicated by the computing resource limitation; and time shifting the generation time of the backup policy based on the resource limitation time.

15. The non-transitory computer readable medium of claim 13, wherein generating the composite workflow comprises: estimating a quantity of computing resources for generating the backup for the virtual machine; making a second determination that the quantity of computing resources exceeds an available quantity of computing resources of the virtual machine using the second tag; and in response to the second determination: time shifting a generation time for generating the backup.

16. The non-transitory computer readable medium of claim 15, wherein the time shifting comprises: changing a start time for generating the backup.

17. The non-transitory computer readable medium of claim 15, wherein the time shifting comprises: expanding a time period for generating the backup, and capping a computing resource utilization rate for generating the backup.

* * * * *